(12) United States Patent
Batchelder

(10) Patent No.: US 11,845,221 B2
(45) Date of Patent: Dec. 19, 2023

(54) METHOD OF THERMALLY TRANSFERRING LAYERS IN A SELECTIVE DEPOSITION-BASED ADDITIVE MANUFACTURING SYSTEM USING CONDUCTIVE HEAT

(71) Applicant: Evolve Additive Solutions, Inc., Minnetonka, MN (US)

(72) Inventor: J. Samuel Batchelder, Somers, NY (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 37 days.

(21) Appl. No.: 16/966,317

(22) PCT Filed: Feb. 1, 2019

(86) PCT No.: PCT/US2019/016281
§ 371 (c)(1),
(2) Date: Jul. 30, 2020

(87) PCT Pub. No.: WO2019/152797
PCT Pub. Date: Aug. 8, 2019

(65) Prior Publication Data
US 2020/0368964 A1    Nov. 26, 2020

Related U.S. Application Data

(60) Provisional application No. 62/625,670, filed on Feb. 2, 2018.

(51) Int. Cl.
*B29C 64/223* (2017.01)
*B33Y 10/00* (2015.01)
(Continued)

(52) U.S. Cl.
CPC .......... *B29C 64/223* (2017.08); *B29C 64/153* (2017.08); *B29C 64/245* (2017.08);
(Continued)

(58) Field of Classification Search
CPC ..... B29C 64/30; B29C 64/223; B29C 64/153; B29C 64/245; B29C 64/295; B29C 64/393; B33Y 10/00; B33Y 30/00; B33Y 50/02
See application file for complete search history.

(56) References Cited

U.S. PATENT DOCUMENTS 3,755,886 A * 9/1973 Hermann ............... B23K 1/085
228/205
8,488,994 B2    7/2013 Hanson et al.
(Continued)

FOREIGN PATENT DOCUMENTS

CA          950960       7/1974
WO       2016184994     11/2016
(Continued)

OTHER PUBLICATIONS

"International Preliminary Report on Patentability," for PCT Application No. PCT/US2019/016281 dated Aug. 13, 2020 (10 pages).
(Continued)

*Primary Examiner* — Nahida Sultana
*Assistant Examiner* — Jamel M Nelson
(74) *Attorney, Agent, or Firm* — Pauly, DeVries Smith & Deffner LLC

(57) ABSTRACT

Disclosed are selective deposition-based additive manufacturing systems (10) and methods for printing a 3D part (26). Layers of a powder material (22) are developed using one or more electrostatographic engines (12*a-d*). The layers (22) are transferred for deposition on a part build surface (88). For each of the layers (22), the part build surface (88) is
(Continued)

pre-heated by impinging a first heat transfer liquid (74) toward the part build surface (88), for example using a solder fountain. The developed layer (22) is pressed into contact with the heated part build surface (88) to heat the developed layer (22) to a flowable state and form a new part build surface (88) which is fully consolidated. The new part build surface (88) is then rapidly cooled to remove the heat energy added during heating step before repeating the steps for the next developed layer (22).

11 Claims, 7 Drawing Sheets

(51) Int. Cl.
    *B33Y 30/00*     (2015.01)
    *B33Y 50/02*     (2015.01)
    *B29C 64/153*     (2017.01)
    *B29C 64/245*     (2017.01)
    *B29C 64/295*     (2017.01)
    *B29C 64/393*     (2017.01)

(52) U.S. Cl.
    CPC .......... *B29C 64/295* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 8,879,957 B2 | 11/2014 | Hanson et al. |
| 2002/0145213 A1* | 10/2002 | Liu .......................... B29C 64/40 700/118 |
| 2013/0075013 A1* | 3/2013 | Chillscyzn ......... G03G 15/2021 156/499 |
| 2013/0075033 A1 | 3/2013 | Chillscyzn et al. |
| 2013/0077996 A1 | 3/2013 | Hanson et al. |
| 2013/0186549 A1 | 7/2013 | Comb et al. |
| 2013/0186558 A1 | 7/2013 | Comb et al. |
| 2014/0119796 A1* | 5/2014 | Priebe ................. G03G 15/2096 399/340 |
| 2017/0113405 A1* | 4/2017 | Gandhi ................ B29C 64/393 |

FOREIGN PATENT DOCUMENTS

| | | | |
|---|---|---|---|
| WO | WO-2016184994 A1 * | 11/2016 | .......... B29C 64/129 |
| WO | 2017117380 | 7/2017 | |
| WO | 2019152797 | 8/2019 | |

OTHER PUBLICATIONS

"International Search Report and Written Opinion," for PCT Application No. PCT/US2019/016281 dated Apr. 17, 2019 (12 pages).

* cited by examiner

METHOD OF THERMALLY TRANSFERRING LAYERS IN A SELECTIVE DEPOSITION-BASED ADDITIVE MANUFACTURING SYSTEM USING CONDUCTIVE HEAT

BACKGROUND

The present disclosure relates to systems and methods for additive manufacturing of three-dimensional (3D) parts, and more particularly, to additive manufacturing systems and processes for building 3D parts and their support structures.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

In an electrophotographic 3D printing process, each slice of the digital representation of the 3D part and its support structure is printed or developed using an electrophotographic engine. The electrophotographic engine uses charged powder materials that are formulated for use in building a 3D part (e.g., a polymeric toner material). The electrophotographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

In some electrophotographic 3D printing, the processes can be termed sedimentary, with a part under construction being porous at the most recently transferred layer(s). As additional layers are added to a layer and compressed, the porosity of the layer decreases. In some processes, it has been found that a layer becomes fully fused or consolidated when the layer is between approximately 10 to 20 layers deep into the part.

Porous surface layers of a part under construction can be disadvantageous for a number of reasons. For example, the thermal properties of a porous surface make it hard to heat and cool. The pores make the thermal paths through the polymer tortuous, and the many air-polymer interfaces have impedance mismatches for phonon (heat) transfer. Further, some of the embedded pores become closed cells with the addition of new layers. These become particularly hard to eliminate, as the trapped gas has to be dissolved into the polymer. Porous layers also provide other disadvantages in electrophotographic 3D printing processes, including potentially weakening the part.

SUMMARY

Aspects of the present disclosure are directed toward selective deposition-based additive manufacturing systems and methods for printing three-dimensional (3D) structures. Some embodiments of the system include at least one electrostatographic imaging engine configured to develop imaged layers of a thermoplastic-based powder, a build platform, and a rotatable belt having a transfer surface and an opposing contact surface, with the transfer surface configured to receive the developed layers from the imaging engine in a successive manner, and to convey the received developed layers to the build platform in a successive manner A first heater is configured to heat a part build surface of the 3D part, supported by a build platform, by impinging a first heat transfer liquid toward the part build surface to transfer heat to the part build surface. A pressing component is configured to press one of the developed layers on the transfer surface of the transfer belt into contact with the heated part build surface to heat the developed layer to a flowable state by conduction from the part build surface to form a new part build surface. A cooling unit is configured to cool the new part build surface to remove heat energy.

A controller is configured to control the imaging engine, the moveable build platform, the rotatable belt, the first heater, the pressing component and the cooling unit. After forming the new part build surface, for each subsequent one of the developed layers, the controller sequentially controls the first heater to heat the part build surface by impinging the first heat transfer liquid onto the part build surface, the pressing component to press the subsequent one of the developed layers into contact with the part build surface to form a new part build surface, and the cooling unit to cool the new part build surface to remove heat energy to form the 3D part in a layer-by-layer manner.

In accordance with an aspect of the present disclosure, the first heater is configured to heat the part build surface of the 3D part by impinging the first heat transfer liquid directly onto the part build surface to transfer heat to the part build surface. In accordance with an alternative aspect of the present disclosure, the first heater is configured to heat the part build surface of the 3D part by impinging the first heat transfer liquid directly onto a medium in contact with the part build surface. For example, in some aspects of the present disclosure, the medium is a belt interposed between the first heater and the part build surface.

In accordance with another aspect of the present disclosure, the first heat transfer liquid is a liquid metal alloy. To impinge the first heat transfer liquid toward, or onto, the part build surface, the first heater is a solder fountain in some aspects of the disclosure.

In accordance with another aspect of the disclosure, the cooling unit is configured to cool the new part build surface to remove heat energy by impinging a second heat transfer liquid toward the new part build surface to transfer heat from the new part build surface. In accordance with some aspects of the disclosure, the second heat transfer liquid includes at least one of water, Freon, oil, liquid nitrogen, mercury and gallium.

In accordance with another aspect of the disclosure, the selective deposition-based additive manufacturing system includes a second heater configured to pre-heat the developed layers on the transfer surface of the transfer belt by impinging a third heat transfer liquid onto the opposing contact surface of the transfer belt. The second heater can be a solder fountain like the first heater, and the third heat transfer liquid can be the same as the first heat transfer liquid, or can be a different heat transfer liquid.

An aspect of the present disclosure includes a method for printing a three-dimensional (3D) part with a selective deposition-based additive manufacturing system. The method includes developing layers of a powder material using at least one electrostatographic engine and transferring the developed layers from the at least one electrostatographic engine to a transfer medium. The method also includes heating a part build surface of the 3D part by impinging a first heat transfer liquid toward the part build surface to transfer heat to the part build surface, pressing one of the developed layers on the transfer medium into contact with the part build surface thereby heating the one of the developed layers to a flowable state by conduction from the part build surface to form a new part build surface, and cooling the new part build surface to remove heat energy. The steps of heating the part build surface by impinging the first heat transfer liquid toward the part build surface, pressing one of the developed layers on the transfer medium into contact with the part build surface to form a new part build surface, and cooling the new part build surface to remove heat energy are repeated sequentially for each subsequent one of the developed layers to form the 3D part in a layer-by-layer manner.

In accordance with an aspect of the present disclosure, in the heating step, heating the part build surface of the 3D part by impinging the first heat transfer liquid toward the part build surface comprises impinging the first heat transfer liquid directly onto the part build surface to transfer heat to the part build surface.

In accordance with an aspect of the present disclosure, heating the part build surface of the 3D part by impinging the first heat transfer liquid toward the part build surface to transfer heat to the part build surface can include heating the part build surface of the 3D part to a temperature within a range between a flowable temperature and a thermal-degradation kinetics threshold to form a flowable part build surface. Pressing the one of the developed layers on the transfer medium into contact with the part build surface can then comprise pressing the one of the developed layers on the transfer medium into contact with the flowable part build surface to place the flowable surface into intimate contact with the one of the developed layers and thereby heating the one of the developed layers to the flowable state by conduction from the part build surface to form the new part build surface. Heating the part build surface of the 3D part by impinging the first heat transfer liquid toward the part build surface transfers heat into layers of the 3D part adjacent the part build surface.

In accordance with an aspect of the present disclosure, heating the part build surface of the 3D part by impinging the first heat transfer liquid toward the part build surface includes heating the part build surface of the 3D part by impinging a liquid metal alloy toward the part build surface, for example using a solder fountain.

In accordance with an aspect of the present disclosure, heating the part build surface of the 3D part by impinging the first heat transfer liquid toward the part build surface comprises impinging the first heat transfer liquid directly onto a medium in contact with the part build surface. For instance, the first heat transfer liquid can be impinged directly onto a belt interposed between the first heat transfer liquid and the part build surface.

In accordance with an aspect of the present disclosure, cooling the new part build surface to remove heat energy includes impinging a second heat transfer liquid toward the new part build surface to transfer heat from the new part build surface. The second heat transfer liquid can comprise at least one of water, Freon, oil, liquid nitrogen, mercury and gallium. Impinging the second heat transfer liquid toward the new part build surface can comprise impinging the second heat transfer liquid onto the new part build surface using a fountain cooler.

Definitions

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
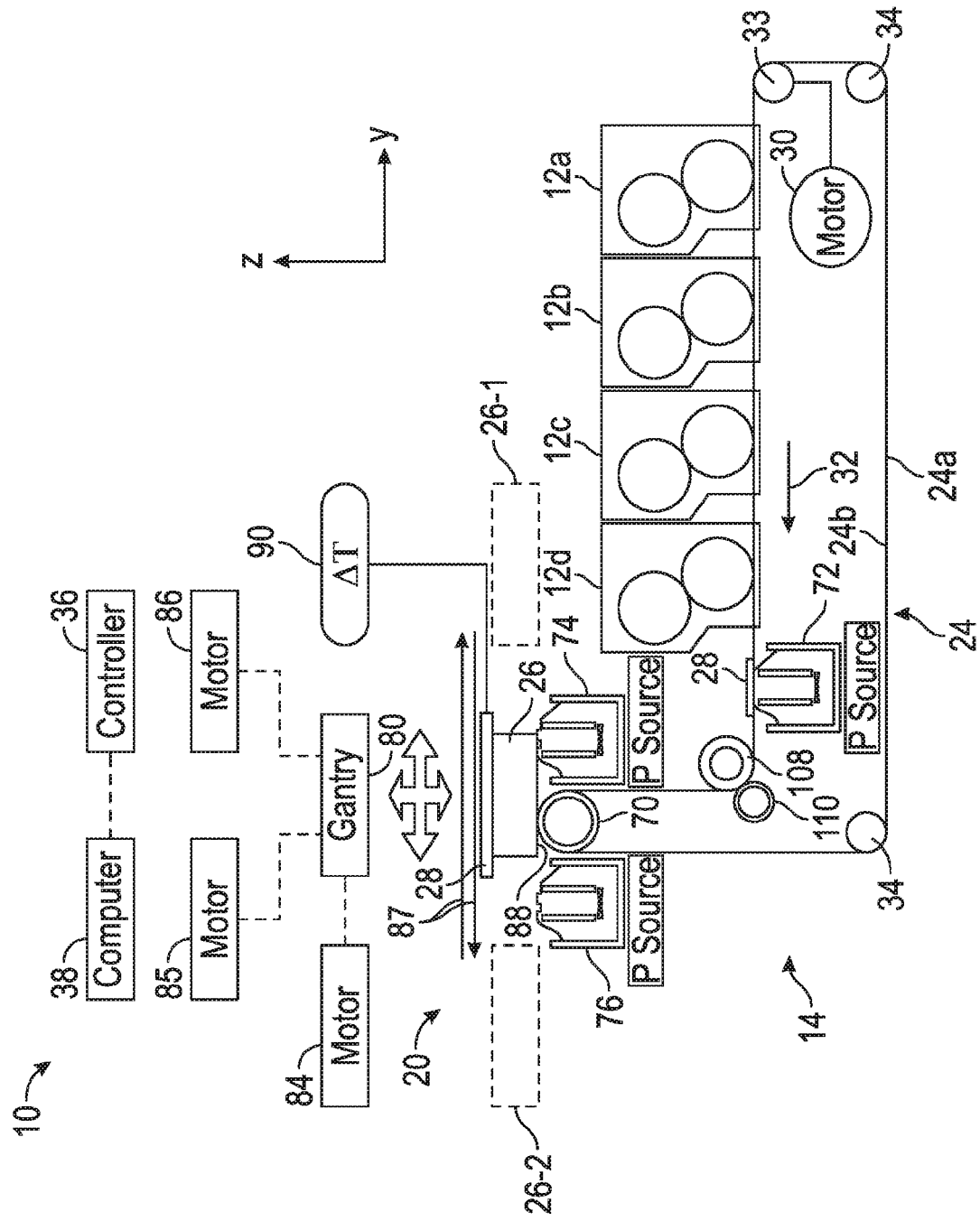
FIG. 1 is a simplified diagram of an exemplary selective deposition-based additive manufacturing system for printing 3D parts and associated support structures, in accordance with embodiments of the present disclosure.

Embodiments of the disclosure are described more fully hereinafter with reference to the accompanying drawings. Elements that are identified using the same or similar reference characters refer to the same or similar elements. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, the present disclosure may be embodied as methods, systems, devices, and/or computer program products, for example. Accordingly, the present disclosure may take the form of an entirely hardware embodiment, an entirely software embodiment or an embodiment combining software and hardware aspects. The computer program or software aspect of the present disclosure may comprise computer readable instructions or code stored in a computer readable medium or memory. Execution of the program instructions by one or more processors (e.g., central processing unit), such as one or more processors of a controller, results in the one or more processors performing one or more functions or method steps described herein. Any suitable patent subject matter eligible computer-readable media or memory may be utilized including, for example, hard disks, CD-ROMs, optical storage devices, or magnetic storage devices. Such computer-readable media or memory do not include transitory waves or signals.

The computer-readable medium or memory mentioned herein, may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As mentioned above, during a selective deposition-based 3D part additive manufacturing or printing operation, electrostatographic engines develop each layer of a 3D part out of charged powder materials (e.g., polymeric toilers) using the electrophotographic process. A completed layer of the 3D part typically includes a part portion formed of part material by one electrostatographic engine that is transferred to a suitable transfer medium, such as a transfer belt or drum, and/or a support structure portion formed of support material by a different electrostatographic engine that is applied to the transfer medium in registration with the corresponding part portion. Alternatively, the part portion may be developed and transferred to the transfer medium in registration with a previously printed support structure portion on the transfer medium. Further, a plurality of layers can be imaged in a reverse order of printing and stacked one on top of the other on the transfer medium to form a stack of a selected thickness.

The transfer medium delivers the developed layers or the stack of layers to a transfusion assembly where a transfusion process is performed to form a 3D structure in a layer-bylayer manner, a stack-by-stack manner or a combination of individual layers and stacks of layers to form the 3D part and corresponding support structure. During the transfusion process, heat and pressure is applied to fuse the developed layers or stacks of layers to build surfaces of the 3D structure. After printing of the 3D structure is completed, the support structures can then be dissolved or disintegrated in an aqueous solution or dispersion to reveal the completed 3D part.

While the present disclosure can be utilized with any electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

FIG. 1 is a simplified diagram of an exemplary electrophotography-based additive manufacturing system 10 for printing 3D parts and associated support structures in a layer-by-layer manner, one beneath another, in accordance with embodiments of the present disclosure. While illustrated as printing 3D parts and associated support structures in a layer-by-layer manner, the system 10 can also be used to form stacks of layers and transfuses the stacks to form the 3D parts and associated support structures.

As shown in FIG. 1, system 10 includes one or more electrophotographic (EP) engines, generally referred to as 12, such as EP engines 12a-d, a transfer assembly 14, and a transfusion assembly 20. Examples of suitable components and functional operations for system 10 include those disclosed in Hanson et al., U.S. Pat. Nos. 8,879,957 and 8,488,994, and in Comb et al., U.S. Publication Nos. 2013/0186549 and 2013/0186558, which are each incorporated by reference in their entirety. While the components and operations described in these examples print parts by depositing layers on top of each other, as opposed to underneath of each other as in the present disclosure, the components and operations can be substantially the same or similar.

The EP engines 12 are imaging engines for respectively imaging or otherwise developing completed layers of the 3D part, which are generally referred to as 22, of the charged powder part and support materials. The charged powder part and support materials are each preferably engineered for use with the particular architecture of the EP engines 12. In some embodiments, at least one of the EP engines 12 of the system 10, such as EP engines 12a and 12c, develops layers of the support material to form the support structure portions 22s (shown in FIGS. 2 and 3) of a layer 22, and at least one of the EP engines 12, such as EP engines 12b and 12d, develops layers of the part material to form the part portions 22p (also shown in FIGS. 2 and 3) of the layer 22. The EP engines 12 transfer the formed part portions 22p and the support structure portions 22s to a transfer medium 24. In some embodiments, the transfer medium 24 is in the form of a transfer belt, as shown in FIG. 1. Examples of suitable transfer belts for the transfer medium 24 include those disclosed in Comb et al. (U.S. Publication Nos. 2013/0186549 and 2013/0186558). The transfer medium 24 may take on other suitable forms in place of, or in addition to, the transfer belt, such as a transfer drum. Accordingly, embodiments of the present disclosure are not limited to the use of transfer mediums 24 in the form of the transfer belt.

In some embodiments, the system 10 includes at least one pair of the EP engines 12, such as EP engines 12a and 12b, which cooperate to form completed layers 22. In some embodiments, additional pairs of the EP engines 12, such as EP engines 12c and 12d, may cooperate to form other layers 22.

In some embodiments, each of the EP engines 12 that is configured to form the support structure portion 22s of a given layer 22 is positioned upstream from a corresponding EP engine 12 that is configured to form the part portion 22p of the layer 22 relative to the feed direction 32 of the transfer belt 24. Thus, for example, EP engines 12a and 12c that are each configured to form the support structure portions 22s are positioned upstream from their corresponding EP engines 12b and 12d that are configured to form the part portions 22p relative to the feed direction 32 of the transfer belt 24, as shown in FIG. 1. In alternative embodiments, this arrangement of the EP engines 12 may be reversed such that the EP engines that form the part portions 22p may be located upstream from the corresponding EP engines 12 that are configured to form the support structure portions 22s relative to the feed direction 32 of the transfer belt 24. Thus, for example, the EP engine 12b may be positioned upstream from the EP engine 12a, and the EP engine 12d may be positioned upstream of the EP engine 12c relative to the feed direction 32 of the transfer belt 24.

As discussed below, the developed layers 22 are transferred to a transfer medium 24 of the transfer assembly 14, which delivers the layers 22 to the transfusion assembly 20. The transfusion assembly 20 operates to build a 3D structure 26, which includes the 3D part 26p, support structures 26s and/or other features, in a layer-by-layer manner by transfusing the layers 22 together on or under a build platform 28.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The exemplary transfer assembly 14 illustrated in FIG. 1 is highly simplified and may take on other configurations. Additionally, the transfer assembly 14 may include additional components that are not shown in FIG. 1 in order to simplify the illustration, such as, for example, biasing mechanisms 16 (shown in FIGS. 2 and 3) for aiding in the transfer of portions of part layers onto belt 24 by EP engines 12, components for maintaining a desired tension in the belt 24, a belt cleaner for removing debris from the surface 24a that receives the layers 22, and other components.

System 10 also includes a controller 36, which represents one or more processors that are configured to execute instructions, which may be stored locally in memory of the system 10 or in memory that is remote to the system 10, to control components of the system 10 to perform one or more functions described herein. In some embodiments, the processors of the controller 36 are components of one or more computer-based systems. In some embodiments, the controller 36 includes one or more control circuits, microprocessor-based engine control systems, one or more programmable hardware components, such as a field programmable gate array (FPGA), and/or digitally-controlled raster imaging processor systems that are used to control components of the system 10 to perform one or more functions described herein. In some embodiments, the controller 36 controls components of the system 10 in a synchronized manner based on printing instructions received from a host computer 38 or from another location, for example.

In some embodiments, the controller 36 communicates over suitable wired or wireless communication links with the components of the system 10. In some embodiments, the controller 36 communicates over a suitable wired or wireless communication link with external devices, such as the host computer 38 or other computers and servers, such as over a network connection (e.g., local area network (LAN) connection), for example.

In some embodiments, the host computer 38 includes one or more computer-based systems that are configured to communicate with the controller 36 to provide the print instructions (and other operating information). For example, the host computer 38 may transfer information to the controller 36 that relates to the sliced layers of the 3D parts and support structures, thereby allowing the system 10 to print the layers 22 and form the 3D part including any support structures in a layer-by-layer manner. In some embodiments, the controller 36 is also configured to assist in properly registering the printing of the part portions 22p and/or the support structure portions 22s with a previously printed corresponding support structure portion 22s or part portion 22p on the belt 24 to form the individual layers 22.

The components of system 10 may be retained by one or more frame structures. Additionally, the components of system 10 may be retained within an enclosable housing that prevents components of the system 10 from being exposed to ambient light during operation.

Figure 2:
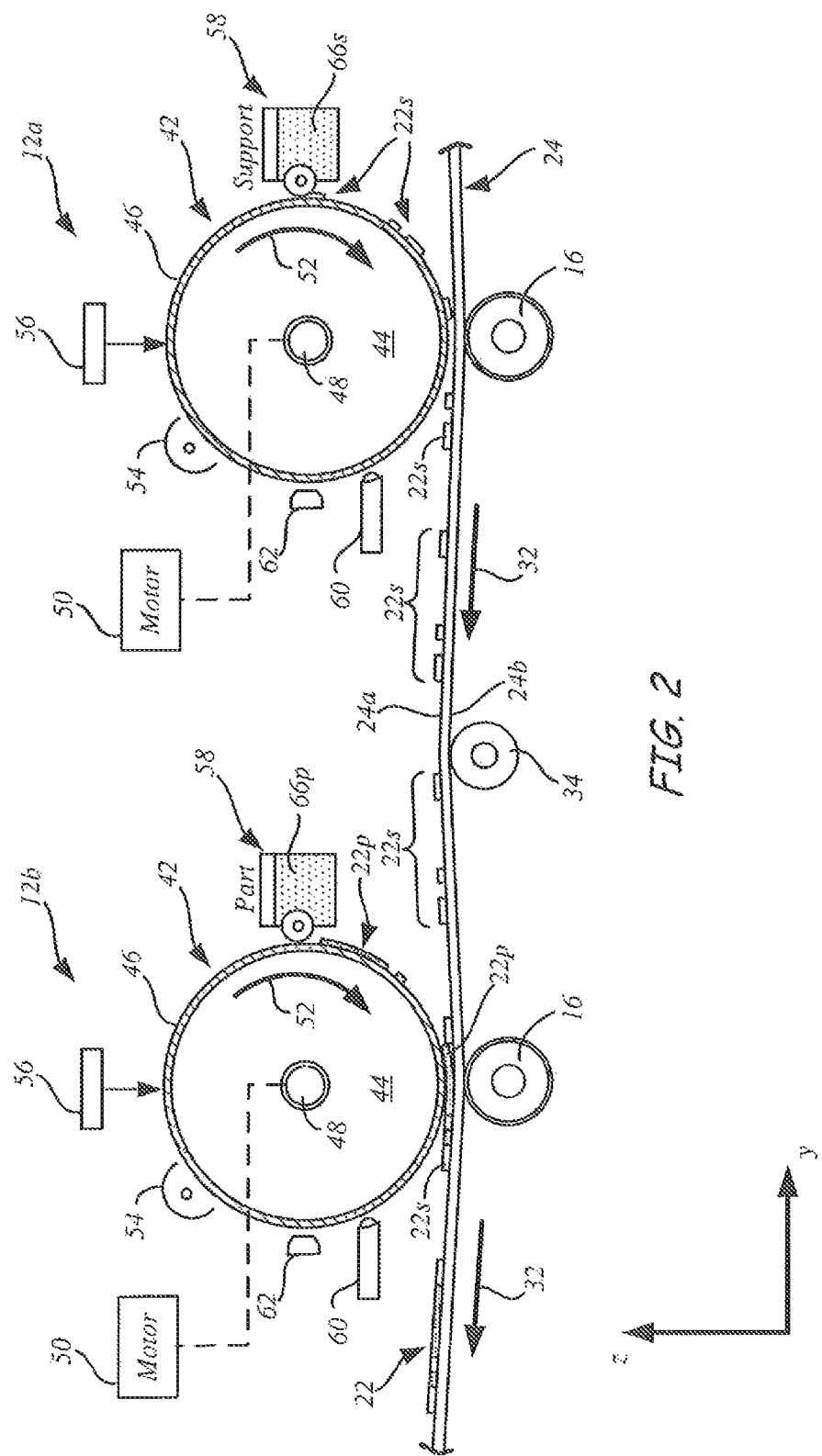
FIG. 2 is a schematic front view of electrophotographic engines, in accordance with exemplary embodiments of the present disclosure.

Referring for the moment to FIG. 2, shown is a schematic front view of the EP engines 12a and 12b of the system 10 of FIG. 1, in accordance with exemplary embodiments of the present disclosure. In the shown embodiment, the EP engines 12a and 12b may include the same components, such as a photoconductor drum 42 having a conductive body 44 and a photoconductive surface 46. The conductive body 44 is an electrically-conductive body (e.g., fabricated from copper, aluminum, tin, or the like), that is electrically grounded and configured to rotate around a shaft 48. The shaft 48 is correspondingly connected to a drive motor 50, which is configured to rotate the shaft 48 (and the photoconductor drum 42) in the direction of arrow 52 at a substantially constant rate. While embodiments of the EP engines 12 are discussed and illustrated as utilizing a photoconductor drum 42, a belt having a conductive material, or other suitable bodies, may also be utilized in place of the photoconductor drum 42 and the conductive body 44.

The photoconductive surface 46 is a thin film extending around the circumferential surface of the conductive body 44 (shown as a drum but can alternatively be a belt or other suitable body), and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers 22 of the 3D part 26p, or support structure 26s.

As further shown, each of the exemplary EP engines 12a and 12b also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46, while the drive motor 50 and the shaft 48 rotate the photoconductor drum 42 in the direction 52.

The EP engines 12 use the charged particle material (e.g., polymeric or thermoplastic toner), generally referred to herein as 66, to develop or form the layers 22. In some embodiments, the image-forming assembly for the surface 46 of the EP engine 12a is used to form support structure portions 22s of the support material 66s, where a supply of the support material 66s may be retained by the development station 58 (of the EP engine 12a) along with carrier particles. Similarly, the image-forming assembly for the surface 46 of the EP engine 12b is used to form part portions 22p of the part material 66p, where a supply of the part material 66p may be retained by the development station 58 (of the EP engine 12b) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

The imager 56 is a digitally-controlled, pixel-wise light exposure apparatus configured to selectively emit electromagnetic radiation toward the uniform electrostatic charge on the surface 46 as the surface 46 rotates in the direction 52 past the imager 56. The selective exposure of the electromagnetic radiation to the surface 46 is directed by the controller 36, and causes discrete pixel-wise locations of the electrostatic charge to be removed (i.e., discharged), thereby forming latent image charge patterns on the surface 46.

Suitable devices for the imager 56 include scanning laser (e.g., gas or solid state lasers) light sources, light emitting diode (LED) array exposure devices, and other exposure devices conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. In accordance with this embodiment, the charge inducer 54 may be eliminated. In some embodiments, the electromagnetic radiation emitted by the imager 56 has an intensity that controls the amount of charge in the latent image charge pattern that is formed on the surface 46.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s, and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged particles of the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s on the surface 46 as the photoconductor drum 42 continues to rotate in the direction 52, where the successive layers 22p or 22s correspond to the successive sliced layers of the digital representation of the 3D part or support structure.

In some embodiments, the thickness of the layers 22p or 22s on the surface 46 depends on the charge of the latent image charge pattern on the surface. Thus, the thickness of the layers 22p or 22s may be controlled through the control of the magnitude of the charge in the pattern on the surface using the controller 36. For example, the controller 36 may control the thickness of the layers 22p or 22s by controlling the charge inducer 54, by controlling the intensity of the electromagnetic radiation emitted by the imager 56, or by controlling the duration of exposure of the surface 46 to the electromagnetic radiation emitted by the imager 56, for example.

The successive layers 22p or 22s are then rotated with the surface 46 in the direction 52 to a transfer region in which layers 22p or 22s are successively transferred from the photoconductor drum 42 to the belt 24 or another transfer medium, as discussed below. While illustrated as a direct engagement between the photoconductor drum 42 and the belt 24, in some preferred embodiments, the EP engines 12a and 12b may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22s and 22p from the EP engines 12a and 12b to the belt 24. Because the layers 22s and 22p are each only a single layer increment in thickness at this point in the process, electrostatic attraction is suitable for transferring the layers 22s and 22p from the EP engines 12a and 12b to the belt 24. In some embodiments, the thickness of the layers 22p or 22s on the surface 24a of the belt 24 depends on the electrical potential induced through the belt by the corresponding biasing mechanism 16. Thus, the thickness of the layers 22p or 22s may be controlled by the controller 36 through the control of the magnitude of the electrical potential induced through the belt by the biasing mechanisms 16.

The controller 36 preferably controls the rotation of the photoconductor drums 42 of the EP engines 12a and 12b at the same rotational rates that are synchronized with the line speed of the belt 24 and/or with any intermediary transfer drums or belts. This allows the system 10 to develop and transfer the layers 22s and 22p in coordination with each other from separate developer images. In particular, as shown, each part of the layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s, or may only include part material 66p, depending on the particular support structure and 3D part geometries and layer slicing.

In an alternative embodiment, the part portions 22p and the support structure portions 22s may optionally be developed and transferred along the belt 24 separately, such as with alternating layers 22s and 22p. These successive, alternating layers 22s and 22p may then be transferred to the layer transfusion assembly 20, where they may be transfused separately to print or build the structure 26 that includes the 3D part 26p, the support structure 26f, and/or other structures.

Figure 3:
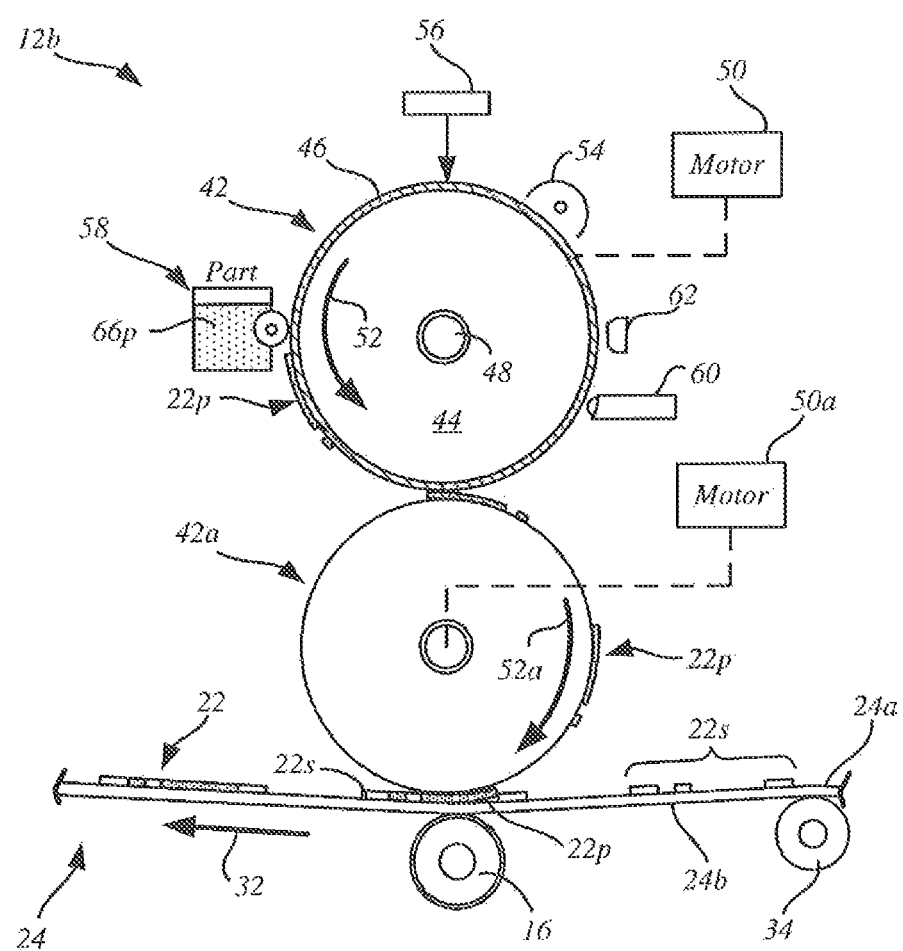
FIG. 3 is a schematic front view of an exemplary electrophotographic engine, which includes a transfer drum or belt, in accordance with exemplary embodiments of the present disclosure.

In a further alternative embodiment, one or both of the EP engines 12a and 12b may also include one or more transfer drums and/or belts between the photoconductor drum 42 and the belt or transfer medium 24. For example, as shown in FIG. 3, the EP engine 12b may also include a transfer drum 42a that rotates in the direction 52a that opposes the direction 52, in which drum 42 is rotated, under the rotational power of motor 50a. The transfer drum 42a engages with the photoconductor drum 42 to receive the developed layers 22p from the photoconductor drum 42, and then carries the received developed layers 22p and transfers them to the belt 24.

The EP engine 12a may include the same arrangement of a transfer drum 42a for carrying the developed layers 22s from the photoconductor drum 42 to the belt 24. The use of such intermediary transfer drums or belts for the EP engines 12a and 12b can be beneficial for thermally isolating the photoconductor drum 42 from the belt 24, if desired.

Referring again to FIG. 1, transfusion assembly 20 include the build platform 28, a pressing component 70, pre-transfusion heaters 72 and 74, and a post-transfusion cooler 76. Pre-transfusion heaters 72 and 74 are, in exemplary embodiments, solder fountain heaters using a liquid metal alloy and configured to rapidly heat the layers 22 to be transfused or the build surface 88 of the part 26. Post-transfusion cooler 76 is, in exemplary embodiments, a fountain cooler using liquid nitrogen, liquid metals, or other liquids to rapidly cool the part build surface and the most recently transfused layers. The pre-transfusion heaters and post-transfusion cooler are discussed below in greater detail.

The build platform 28 is a platform assembly or platen of system 10 that is configured to receive the heated combined layers 22 (or separate layers 22p and 22s) for printing the structure 26 in a layer-by-layer manner. In some embodiments, the build platform 28 may include removable film substrates (not shown) for receiving the printed layers 22, where the removable film substrates may be restrained against the build platform 28 using any suitable technique (e.g., vacuum, clamping or adhering).

The build platform 28 is supported by a gantry 80, or other suitable mechanism, which is configured to move the build platform 28 along the z-axis and the y-axis, as illustrated schematically in FIG. 1, and optionally along the x-axis that is orthogonal to the y and z axes. In some embodiments, the gantry 80 includes a y-stage gantry that is configured to move the build platform 28 along at least the y-axis, and an x-stage gantry that is configured to move the build platform 28 along the x-axis. Such separate y-stage and x-stage gantries are collectively shown in FIG. 1 as gantry 80. In some embodiments, the y-stage gantry of gantry 80 is configured to further move the build platform 28 along the z-axis. Alternatively, the gantry 80 may include a z-stage gantry that is configured to move the build platform along the z-axis. Transfusion assembly 20 can also include a y-stage motor 84 to move the gantry 80 (or a y-stage gantry of gantry 80) along the y-axis in a reciprocating fashion along paths illustrated by direction arrows 87. The transfusion assembly 20 can also include an x-stage motor 85 to move the gantry 80 (or an x-stage gantry of gantry 80) along the x-axis, and a z-stage motor 86 to move the gantry 80 along the z-axis. Operation of motors 84, 85 and 86 can be based on commands from the controller 36. The motors 84, 85 and 86 may each be any suitable actuator, such as an electrical motor, a hydraulic system, a pneumatic system, piezoelectric, or the like.

The operation of gantry 80 can be implemented using various configurations to move the build platform and the part 26 in a pattern to facilitate placement of layers 22 in contact with a build surface of the part. In some embodiments, y-stage gantry components support x-stage gantry components, or vice versa. In some embodiments, the y-stage gantry components are configured to move the build platform 28 and the x-stage gantry components along the z-axis and the y-axis. In some embodiments, the y-stage gantry components of gantry 80 produce a reciprocating rectangular pattern where the primary motion is back-and-forth along the y-axis in directions illustrated by arrows 87. The controller 36 controls the gantry 80 to shift the location of a build surface 88, which is the bottom surface of the printed structure 26, along the y-axis and position the layers 22 in proper registration with the build surface 88 along the y-axis during the transfusion operation which is described below in greater detail.

In some embodiments, x-stage components of gantry 80 are configured to move the build platform 28 along the x-axis relative to y-stage gantry components, thereby moving the build platform 28 and the printed structure 26 in perpendicular or lateral directions relative to the y-axis process direction of arrows 87. This allows the controller 36 to shift the location of the build surface 88 of the structure 26 along the x-axis to position the layers 22 in proper registration with the build surface 88 along the x-axis during the transfusion operation.

In some embodiments, the build platform 28 is heated using a heating element 90 (e.g., an electric heater). The heating element 90 is configured to heat and maintain the build platform 28 at an elevated temperature that is greater than room temperature (25° C.), such as at a desired average part temperature of 3D part 26*p* and/or support structure 26*s*, as discussed in Comb et al., U.S. Publication Nos. 2013/0186549 and 2013/0186558. This allows the build platform 28 to assist in maintaining 3D part 26*p* and/or support structure 26*s* at this average part temperature. However, it must be noted that heating of build platform 28 is not required in all embodiments.

In some embodiments, the pressing component 70 is configured to press the layers 22 from the belt to the build surface 88 of the structure 26 to transfuse the layers 22 to the build surface 88. In some embodiments, the pressing component 70 is configured to press each of the developed layers 22 on the belt 24 or other transfer medium into contact with the build surfaces 88 of the structure 26 on the build platform 28 for a dwell time to form the 3D structure 26 in a layer-by-layer manner.

The pressing component 70 may take on any suitable form. In some exemplary embodiments, the pressing component 70 is in the form of a nip roller. The pressing component 70 can include a pressing plate, such as discussed in Comb et al., in U.S. Pub. Nos. 2013/0186549 and 2013/0075033, which are each incorporated by reference in their entirety. In some exemplary embodiments, the pressing component 70 includes the support of the belt 24 between pairs of rollers, such as discussed in Comb et al., in U.S. Pub. Nos. 2013/0186549 and 2013/0075033. The pressing component 70 may also take on other suitable forms. Thus, while embodiments will be described below using the nip roller embodiment of the pressing component 70, it is understood that embodiments of the present disclosure include the replacement of the nip roller with another suitable pressing component 70. Although not shown in FIG. 1, in some embodiments, the pressing component 70 includes a heating element (e.g., an electric heater) that is configured to maintain the pressing component 70 at an elevated temperature that is greater than room temperature (25° C.), such as at a desired transfer temperature for the layers 22.

Also shown in FIG. 1, transfusion assembly 20 can also include a planishing roller 108. Planishing rollers such as roller 108 serve to compact a layer to reduce voids, potentially to heat a layer to remove at least some moisture and solvents, and/or to create films that support tensile loading. After heating by pre-transfusion heater 72, roller 108 presses the layer 22 between itself and a pressing component 110 in this embodiment. Planishing roller 108 can also be used instead to press the layer against roller 70 in alternate embodiments without departing from the scope of the disclosure. While a planishing roller can be used to reduce voids or pores, disclosed techniques and methods of rapidly heating the part layers at build surface 88 to fully consolidate each layer at the time of transfer onto the build surface do not require planishing in all embodiments.

In exemplary embodiments, the pre-transfusion heater 72 includes one or more heating devices that are configured to heat the layers 22 on the belt 24 to a temperature near an intended transfer temperature of the layer 22, such as at least a fusion temperature of the part material 66*p* and the support material 66*s*, prior to reaching nip roller 70. As mentioned, pre-transfusion heater 72 is a solder fountain heater in some embodiments, though in other embodiments heater 72 can be other types of heaters, such as an infrared heater and/or a heated air jet, while pre-transfusion heater 74 is a solder fountain heater. An example solder fountain heater is discussed below with reference to FIG. 4A. Each layer 22 desirably passes by (or through) the heater 72 for a sufficient residence time to heat the layer 22 to a temperature that is typically below a temperature required to transfuse the layer onto the previously printed layers. In other embodiments, layers 22 are either not heated, or are heated but to a temperature lower than the fusion temperature of the part material and then are pressed into a part build surface 88 which has been rapidly heated to a temperature in a range between the temperature at which the material flows and a thermal-degradation kinetics threshold for the part material, such that the heated temperature is at or above the temperature at which the material flows and below the thermal-degradation kinetics threshold. If layers 22 are not heated, heater 72 can be optionally omitted in some embodiments.

The pre-transfusion heater 74 is, in exemplary embodiments, a solder fountain heater that heats the build surface of the 3D part 26*p* and support structure 26*s* (collectively part 26 in FIG. 1) on the build platform 28 to an elevated temperature. This elevated temperature is a temperature that is higher than a temperature of a layer 22 to be transfused onto the part 26 and the temperature of the belt 24. Further, in some embodiments described further below, pre-transfusion heater 74 is configured to rapidly heat the build surfaces of the part 26 to at least the temperature where the part material flows, but below the thermal-degradation kinetics threshold.

In some embodiments, the support material 66s, which is used to form the support structure portions 22s and the support structure 26s, preferably has a rheology that is similar to or substantially the same as the rheology of the part material 66p that is used to form the part portions 22p and the 3D part 26p. This allows the part and support materials 66p and 66s of the layers 22p and 22s to be heated together with the heater 72 to, for example, substantially the same transfer temperature. Thus, the part portions 22p and the support structure portions 22s may be transfused together to the build surfaces 88 of the 3D part 26p and the support structure 26s in a single transfusion step as the combined layer 22 where heat in the build surface layers of part 26p and support structure 26s is rapidly diffused into the cooler layers 22 to heat the layers 22 to a temperature which results in the transfusion of the layers 22 to the part 26, and consolidation of the transferred layer to eliminate pores or voids.

Post-transfusion cooler 76 is located downstream from nip roller 70 relative to the direction in which the build platform 28 is moved along the y-axis by the gantry 80, and is configured to rapidly cool the transfused layers 22. The post-transfusion cooler 76 removes a sufficient amount of heat to maintain the printed structure at a thermally stable average part temperature such that the part being printed does not deform due to heating or processing conditions during the transfusion process. The post-transfusion cooler 76 removes substantially all of the heat imparted into the 3D part with the transfused layer to maintain the 3D part being printed at a thermally stable average bulk part temperature. In exemplary embodiments, while heater 74 is configured to rapidly heat the build surface 88 immediately prior to the transfer of a layer 22 from belt 24, cooler 76 quickly removes the heat energy from the part 26 to prevent degradation of the part material.

During the printing or transferring operation, the belt 24 carries a layer 22 past the heater 72, which may heat the layer 22 and the associated region of the belt 24 to the transfer temperature. Suitable transfer temperatures for the part and support materials 66p and 66s of the present disclosure include temperatures that exceed the glass transition temperature of the part and support materials 66p and 66s, where the layer 22 is softened but not completely flowable. thermal During operation, the gantry 80 may move the build platform 28 with part 26 in a reciprocating pattern 87 to position part 26 at various positions. For example, as shown in FIG. 1, part 26 can be moved along the y-axis between a part position 26-1 and a part position 26-2. Between part positions 26-1 and 26-2, part build surface 88 is moved past pre-transfusion heater 74 which rapidly heats the part build surface, past pressing component 70 which transfuses layer 22 onto the part build surface, and past post-transfusion cooler 76 which rapidly cools the new part build surface including the transfused layer. For example, as the gantry 80 moves the build platform 28 along the y-axis in the direction 87 above, along, or through the heater 74, the heater 74 rapidly heats the build surfaces 88 of the part 26 to an elevated temperature, such as at or above a flowable temperature of the part and support materials which is above the temperature of layer 22 to be transferred but below a thermal-degradation kinetics threshold of the material. In these embodiments in which heater 74 heats the surface of the part 26 to a temperature in excess of the temperature of layer 22, the part surface functions to rapidly diffuse heat into the layer 22 that is to be transfused. Further examples of such embodiments are described below in greater detail.

The heating of the part surface to at least the flowable temperature of the material enables a rapid heat transfer from the part surface to the layer to be transfused to aid in fully consolidating the layer as it is transferred. The layer 22 is transfused by pressing the component 70 against the belt 24 to sandwich the layer 22 between the belt 24 and the part 26. The higher temperature of the part 26 enables heat diffusion from the part surface 88 into the layer 22. This, combined with the pressing of press component 70, transfuses the layer 22 to the part 26 and fully consolidates the layer, eliminating voids. Cooler 76 is used to rapidly cool the part surface to remove the heat energy added immediately prior to transfusion. For example, cooler 76 can cool the part surface to a temperature sufficiently cool that it is substantially non-flowing, in one embodiment below a temperature at which the at the Young's Modulus sharply declines. The tackiness of the layer 22 and pressure from the transfusion process, combined with the surface of the part 26 being heated to a flowable temperature in excess of the layer temperature, allows the heat to rapidly diffuse to the layer 22 from the adjacent few layers of part 26 to assist in transfusion from the belt to the part being printed.

The upper range of temperature to which heater 74 heats the build surface 88 and layers adjacent to the build surface, which will not result in degradation of the build material, can be determined by the time and temperature dependent thermal-degradation kinetics threshold (TDKT). The TDKT is a time-temperature parameter that defines a rate of thermal degradation of a polymeric material, such as by depolymerization, backbone chain scission, pendant-group stripping, polymer cross linking, and/or oxidation processes. The thermal degradation of a material can reduce the desired physical properties of the material, such as changing the glass transition temperature, dissolution characteristics, physical appearance, adhesive properties, and the like. These effects can cause defects in the part being printed.

The TDKT reaction rate typically follows the first-order Arrhenius equation, which is substantially linear with time and exponential with temperature. As an example, for a material exposed to a selected elevated temperature for a selected duration, increasing the exposure temperature by a small amount (e.g., about 10° C.) or reducing the exposure duration by about 50% (e.g., doubling the flow rate) may net about the same thermal reaction rates on the support material, although the particular net thermal effects may vary depending on the support material composition.

It should be understood that the example temperatures discussed herein are for ABS materials. However, the use of other materials will use different temperatures without departing from the scope of the disclosure.

In general, the continued rotation of the belt 24 and the movement of the build platform 28 align the layer 22 with the rapidly heated build surfaces 88 of part 26 along the y-axis. The gantry 80 may move the build platform 28 along the y-axis at a rate that is synchronized with the rotational rate of the belt 24 in the feed direction 32 (i.e., the same directions and speed). This causes the rear surface 24b of the belt 24 to rotate around the nip roller 70 to nip the belt 24 and the layer 22 against the build surfaces 88 of the part 26 at a pressing location or nip of the nip roller 70. This pressing of the layer 22 against the heated build surfaces 88 of the part 26 at the location of the nip roller 70, allows heat transfer from the build surface into the layer 22, which transfuses a portion of the layer 22 above the nip roller 70 to the corresponding build surfaces 88 while fully consolidating the layer 22 to the build surface.

In some embodiments, a pressure that is applied to the layer 22 between the belt 24 and the build surfaces 88 during this pressing stage of the transfusion process is controlled by the controller 36 through the control of a pressing component roller bias mechanism. The pressing component bias mechanism controls a position of the build surfaces 88 relative to the nip roller 70 or belt 24 along the z-axis. For instance, when the pressing component 70 is in the form of the nip roller, as the separation between the build surfaces 88 and the nip roller 70 or belt 24 is decreased along the z-axis, the pressure applied to the layer 22 increases, and as the separation between the build surfaces 88 and the nip roller 70 or belt 24 is increased along the z-axis, the pressure applied to the layer 22 decreases. In some embodiments, the pressing component bias mechanism includes the gantry 80 (e.g., z-stage gantry), which controls a position of the build platform 28 and the build surfaces 88 along the z-axis relative to the pressing component 70 and the belt 24. In exemplary embodiments described further below, the heater 74 operates to rapidly heat only the layers of part 26 which are most adjacent the build surface 88.

After rapid cooling using cooler 76 to remove the heat energy from the build surface and the most recent transferred layer, the gantry 80 may then actuate the build platform 28 downward, and move the build platform 28 back along the y-axis to a starting position along the y-axis. The build platform 28 desirably reaches the starting position, and the build surfaces 88 are properly registered with the next layer 22 using the gantry 80. The same process may then be repeated for each remaining layer 22 of part 26.

After the part structure 26 is completed on the build platform 28, the structure 26 may be removed from the system 10 and undergo one or more operations to reveal the completed part 26. For example, the support structure may be sacrificially removed from the part using an aqueous-based solution such as an aqueous alkali solution. Under this technique, the support structure may at least partially dissolve or disintegrate in the solution separating the support structure from the 3D part structure in a hands-free manner. In comparison, the part 26p is chemically resistant to aqueous solutions including alkali solutions. This allows the use of an aqueous alkali solution for removing the sacrificial support 26s without degrading the shape or quality of the part 26p. Furthermore, after the support structure 26s is removed, the 3D part 26p may undergo one or more additional processes, such as surface treatment processes.

Liquid metals are considered to be the most capable heat transfer fluids. Liquid metals generally have a high thermal conductivity, and a low viscosity. The capability of liquid metal to transport heat is highlighted by the Peclet number (the characteristic length times velocity divided by the thermal diffusivity) and the Nusselt number (the heat transfer coefficient times a characteristic length divided by the thermal conductivity). Taking the thermal diffusivity and conductivity as examples, Table 1 illustrates these properties for several fluids:

Table 1

TABLE 1

| Material | Thermal diffusivity (mm²/s) | Thermal conductivity (W/m ° C.) |
|---|---|---|
| Water | 0.143 | 0.58 |
| Tin | 40 | ~67 |
| Air | 19 | 0.024 |
| Nylon | 0.09 | 0.25 |
| Mercury | 5,746 | 8.3 |

To an approximation good enough for a EP based additive manufacturing systems such as shown in FIG. 1, a liquid metal impingement flow can source (or sink) as many Joules per square centimeter as is required to bring a surface (e.g., part build surface 88) to the bulk temperature of the liquid metal. Thus, heaters such as one or both of heaters 72 and 74, and coolers such as cooler 76 can use liquid metals, liquid metal alloys, or other fluids (e.g., water) to rapidly heat and cool part layers 22 and part build surface 88. Of particular advantage is that the liquid metal can transmit a high thermal flux without requiring a large temperature gradient; this is helpful in avoiding polymer thermal degradation.

Figure 4:
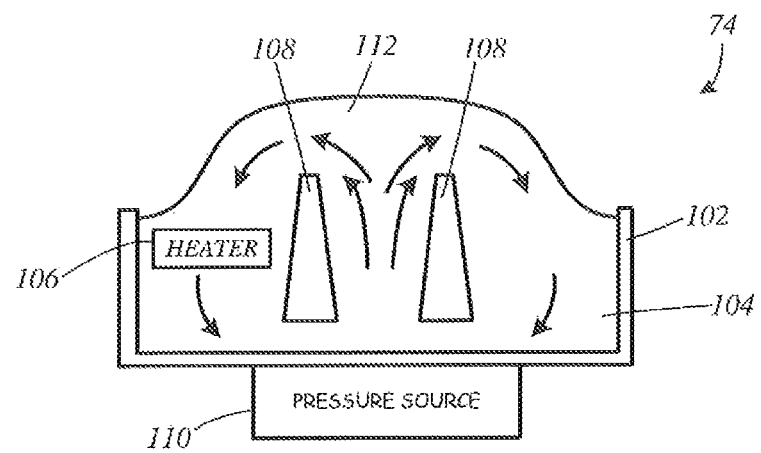
FIG. 4 is a diagrammatic illustration of a solder fountain heater configured for use in the system of FIG. 1.
Figure 6:
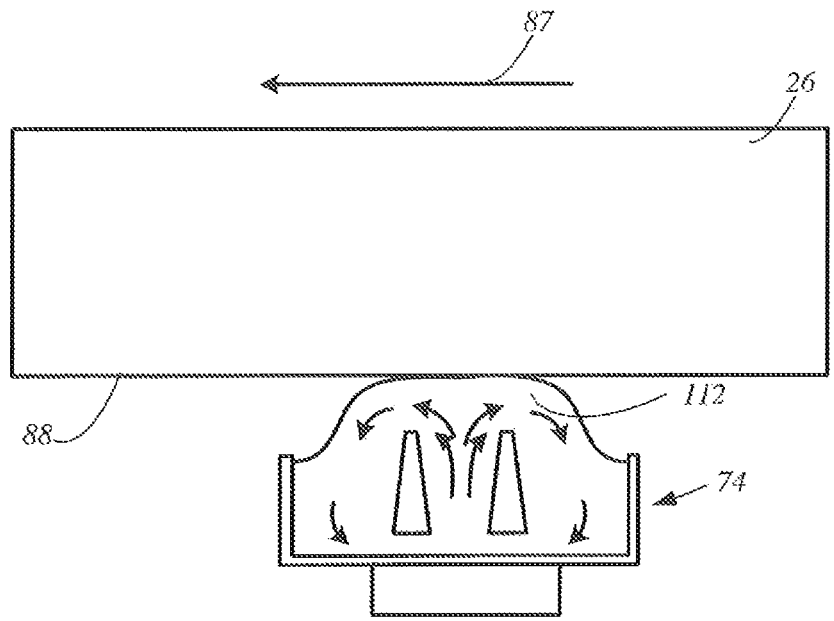
FIG. 6 is a diagrammatic illustration of the solder fountain heater shown in FIG. 4 impinging a heat transfer liquid directly onto a part build surface.
Figure 7:
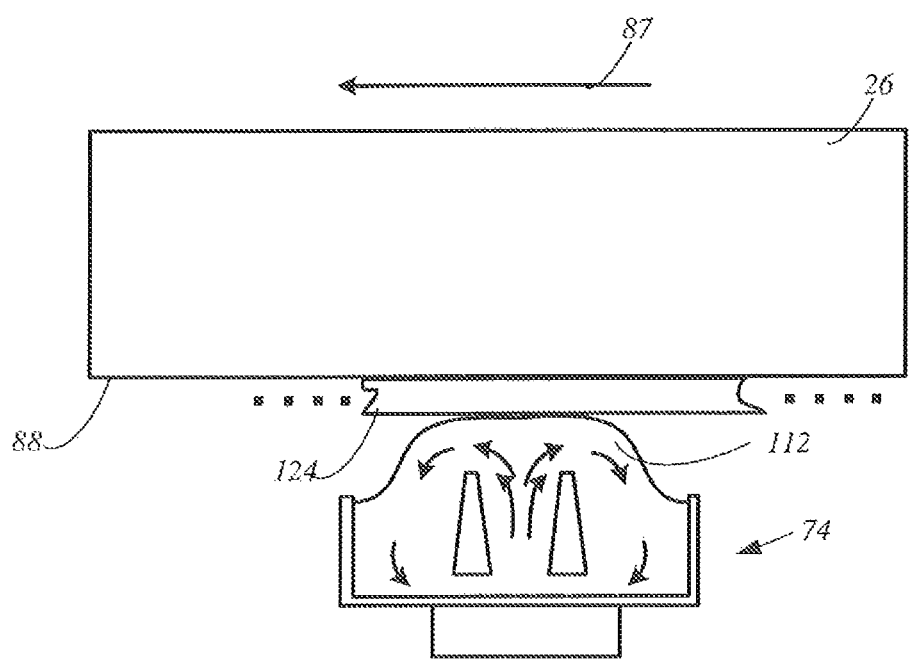
FIG. 7 is a diagrammatic illustration of the solder fountain heater shown in FIG. 4 impinging a heat transfer liquid onto a medium, such as a belt, interposed between the first heater and the part build surface.

Referring now to FIG. 4, shown is example heater 74 configured to utilize a liquid metal or other fluid to rapidly heat part build surface 88. While only heater 74 is shown, heater 72 can be the same or substantially similar to heater 74 in exemplary embodiments. As shown, heater 74 is a solder fountain including a reservoir 102 which holds a heat transfer fluid or liquid 104 such as a molten metal or metal alloy. A fluid heater 106 can also be included to maintain the fluid in a liquid or molten state. With the aid of flow guides or structures 108 and a pressure source 110 (e.g., a pump or other mechanisms configured to generate a flow of the fluid), a wave 112 of the heat transfer liquid is generated for use in impinging the heat transfer liquid toward or onto a surface to be heated, or toward or onto a medium which transfers heat energy from the heat transfer liquid. For example, referring for the moment to FIG. 6, shown is heater 74 impinging a wave 112 of the heat transfer liquid directly onto part build surface 88 of part 26, as the part is moved in the direction of arrow 87, to heat the part build surface and adjacent layers to a flowable state. In the alternative, referring to FIG. 7, heater 74 can impinge the heat transfer liquid onto a medium, such as a belt 124 (e.g., transfer belt 24 or other belt) interposed between the liquid and the part build surface 88. While one particular example of a heater configuration is shown for providing heaters 72 and 74, those of skill in the art will understand that other types of heaters which impinge heat transfer liquids on or toward a surface to be rapidly heated are also contemplated.

Solder fountains, such as those used in the manufacture or printed circuit boards, provide a fast, predictable, and cost-effective way of heating surfaces and materials. A full wave-soldering manufacturing machine, including all of the environment control, board handling, and automation, can be obtained on the market, for example by Manncorp having offices in Huntingdon Valley, PA and San Diego, CA The alloy used in a solder wave determines the minimum temperature. Pure tin, for example, has a low oxidation rate and a melting point of 231.9° C. Lead tin eutectic has a liquidus, or becomes fully liquid, above 180° C. Tin-silver-copper (lead free solder) eutectic has a liquidus of 217° C. The impinging temperature does not need to be much above liquidus, due to the large phase change heat capacity to cool below liquidus.

Figure 5:
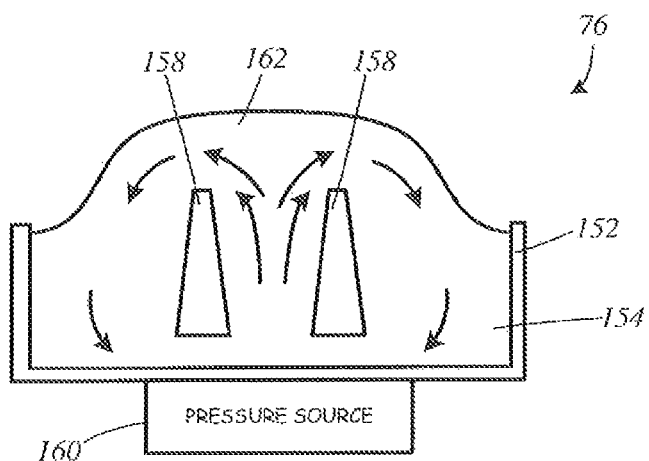
FIG. 5 is a diagrammatic illustration of a fountain cooler configured for use in the system of FIG. 1.

Referring now to FIG. 5, shown is an example embodiment of cooler 76 configured to utilize a second heat transfer liquid to rapidly cool part build surface 88 after a developed imaging layer 22 is pressed and transfused into the part build surface to form a new part build surface. As shown, cooler 76 includes a reservoir 152 which holds a second heat transfer fluid or liquid 154 such as a water, Freon, oil, liquid nitrogen, mercury or gallium. Flow guides or structures 158 and a pressure source 160 (e.g., a pump or other mechanisms configured to generate a flow of the fluid) are used to create a wave 162 of the second heat transfer liquid in order to impinge the heat transfer liquid toward or onto a surface to be heated (e.g., part build surface 88). While one particular example of a cooler configuration is shown for providing cooler 76, those of skill in the art will understand that other types of coolers which impinge heat transfer liquids on or toward a surface to be cooled are also contemplated.

Various heat transfer liquids can be used in exemplary embodiments of the present disclosure. For example, while mercury has the undesirable feature of a poisonously high vapor pressure at room temperature, it does not freeze until −38.8° C., making mercury a candidate for the heat transfer liquid of cooler 76. Although gallium has an unfortunate tendency to oxidize, gallium freezes at 29.7° C., but will supercool below that temperature. Alloys of gallium like Galinstan (68.5% gallium, 21.5% indium, and 10% tin) are molten to −19° C. While liquid metal fountains have the most efficient heat transfer of credible liquids, a fountain of other fluids can also be used for cooling.

For example, if a 340° C. tin fountain is used to heat the part bonding layer, it can be seen that the surface can be heated quickly. The thermal diffusion distance in tin will be about $\sqrt{(\kappa\_tin/\kappa\_ABS)}$ or 20 times farther in the tin than in the plastic of the part layers. The heat capacity for tin is greater than that of the plastic as well, but even ignoring this, bringing 130° C. part material into contact for a nip or pressing dwell time of 33 msec will bring the plastic part material to 19/20*(340−130)° C.+130° C., or 329° C. The average power density transferred is roughly 5 joules/cm$^2$/ 0.033 s or 150 watts/cm$^2$, 50% greater than a Philips VCSEL laser array (at a significantly lower cost). Further, since the alloy bath temperature sets the maximum temperature seen by the part surface 88; there is little excess temperature required to motivate the heat transfer. Of special value, the optical characteristics of the plastic do not matter for convective heating, whereas they matter critically for optical heating.

Figure 8:
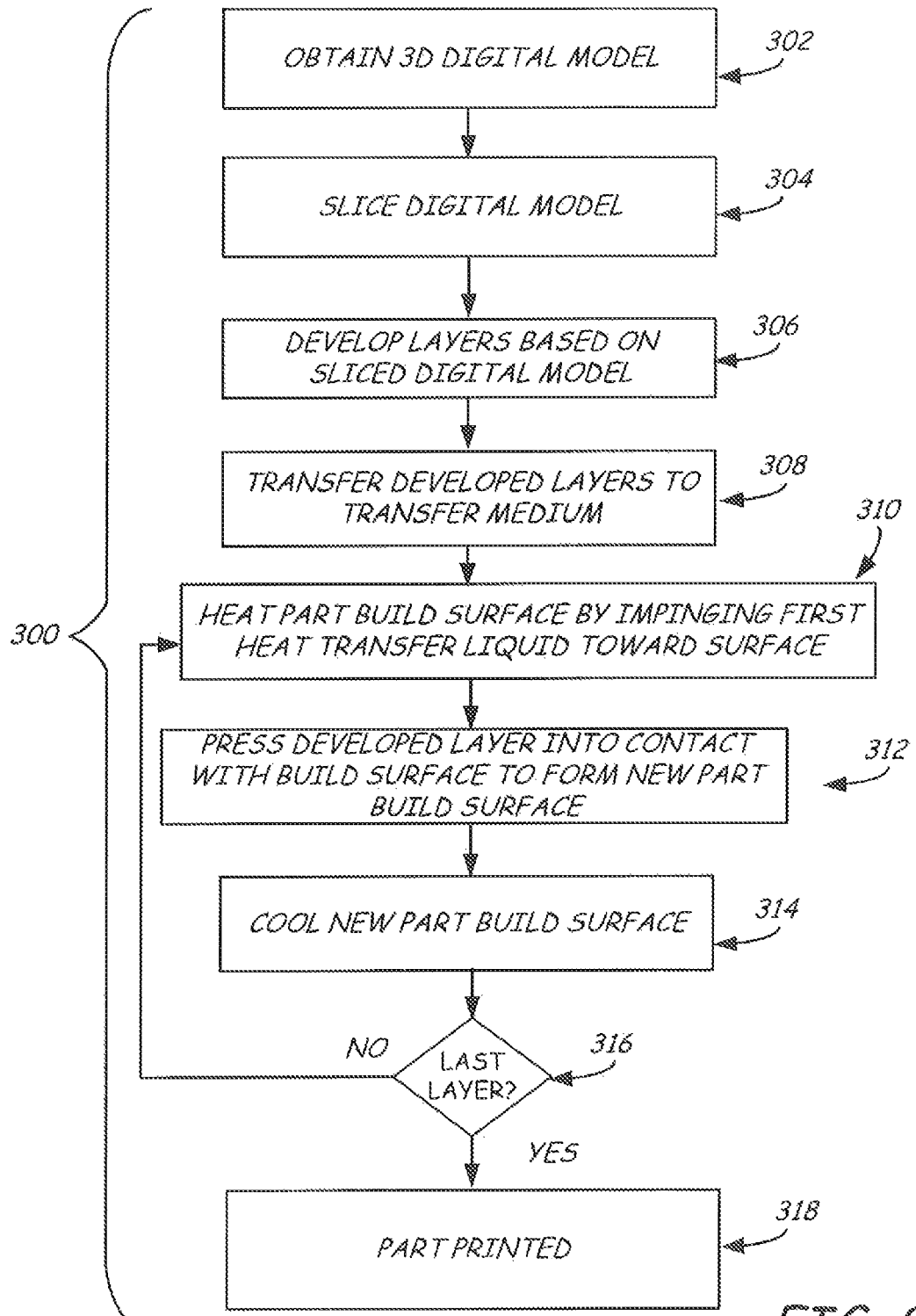
FIG. 8 is a flow diagram of an exemplary method for printing a 3D part with an electrophotography-based additive manufacturing system.

Referring now to FIG. 8, shown is one exemplary embodiment of a method 300 for printing a part using an electrophotographic (EP) additive manufacturing system in accordance with embodiments and concepts discussed above. Disclosed methods, such as shown in FIG. 10, are implement for example in suitably configured or programmed controllers such as controllers 36 and/or 38 in exemplary systems. As shown at step 302, a digital model of the 3D part to be printed is obtained, and at step 304, the digital model is sliced. The digital model slices can then be stored on a computer readable medium and/or output for printing on an EP manufacturing system. While in some embodiments method 300 includes steps 302 and 304, in other embodiments steps 302 and 304 can be omitted and the method can instead begin with a step of obtaining sliced digital model data. At step 306, layers 22 of a powder material are developed using at least one EP engine 12. The developed layers are transferred at step 308 from the one or more EP engines to a transfer medium such as transfer belt 24.

Next, steps 310, 312 and 314 are performed repeatedly, in sequence, for each of multiple developed layers to be transferred to a build surface 88 of the part 26. At step 310, the part build surface is heated (e.g., using heater 74) by impinging a first heat transfer liquid toward the part build surface to transfer heat to the part build surface. This can be implemented, for example, using a solder fountain and a liquid metal or metal alloy. At step 312, one of the developed layers on the transfer medium is pressed into contact with the heated part build surface to heat the developed layer to a flowable state by conduction from the part build surface to form a new part build surface. At step 314, the new part build surface is cooled to remove the heat energy added during heating step 310. As discussed, cooling the new part build surface to remove heat energy can include using a fountain cooler or other device configured to impinge a second heat transfer liquid toward the new part build surface to transfer heat from the new part build surface. The second heat transfer liquid can comprise at least one of water, Freon, oil, liquid nitrogen, mercury and gallium.

At step 316 a determination is made as to whether the last developed layer has been deposited. If the last layer has been deposited, then at final step 318 the part is printed. If the last layer has not been deposited, then steps 310, 312 and 314 are repeated for the next developed layer. By repeating steps 310, 312 and 314 for each layer to be transfused to the part build surface, the part is built in a layer-by-layer manner, but with each layer being fully consolidated before the next developed layer is transfused. This produces a part with fewer voids or pores, if any, and allows build times for each layer to be reduced.

In accordance with an aspect of the present disclosure, in the heating step 310, heating the part build surface 88 of the part 26 by impinging the first heat transfer liquid toward the part build surface comprises impinging the first heat transfer liquid directly onto the part build surface to transfer heat to the part build surface. The part build surface can be heated to a temperature within a range between a temperature at which the material flows and a thermal-degradation kinetics threshold to form a flowable part build surface. Pressing step 312 can then include pressing the developed layer on the transfer medium into contact with a flowable part build surface to place the flowable surface into intimate contact with the one of the developed layers and thereby heating the one of the developed layers to the flowable state by conduction from the part build surface to form the new part build surface. Heating the part build surface of the part by impinging the first heat transfer liquid toward the part build surface transfers heat into layers of the 3D part adjacent the part build surface.

Figure 9:
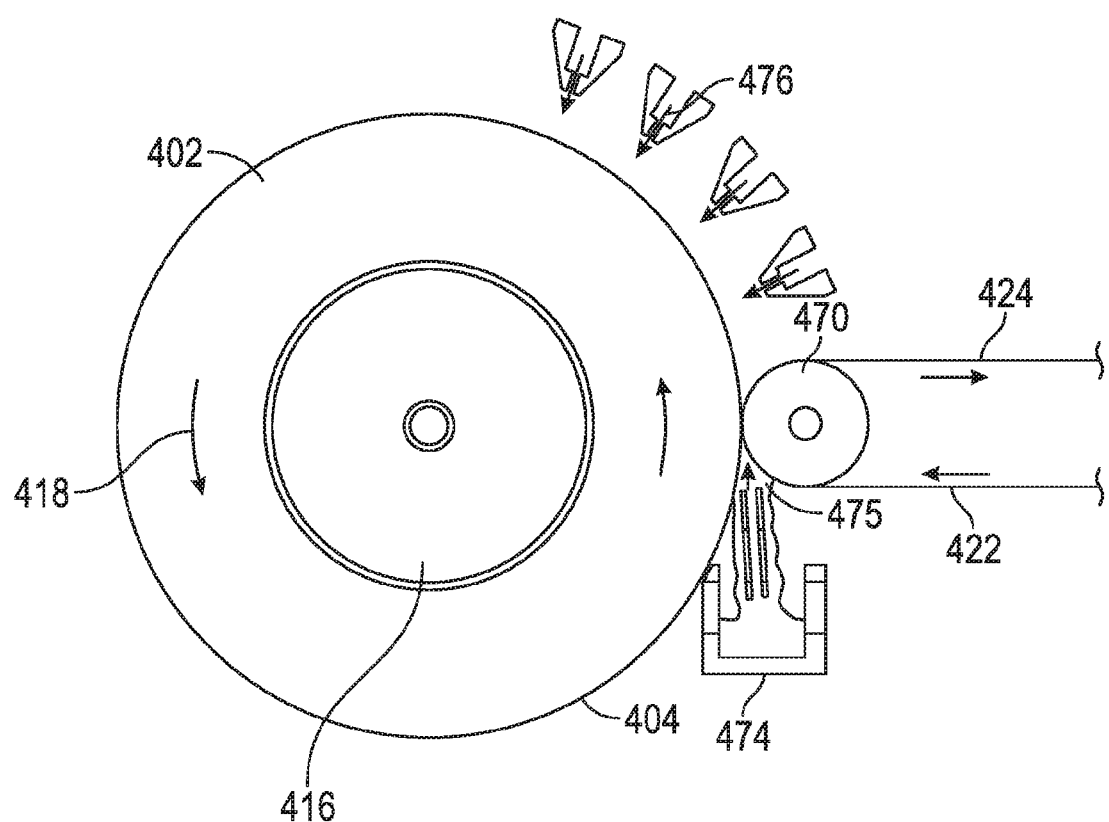
FIG. 9 is a side view of a portion of a drum style selective deposition-based additive manufacturing system with which disclosed features and concepts can be used in an alternative embodiment.

Disclosed embodiments can also be implemented in drum-style additive manufacturing systems which build or print parts using cylindrical layers on a build roller. An example of such an additive manufacturing system, including suitable components and functional operation thereof, is disclosed in Stelter et al., International Publication No. WO 2017/117380 A1, which is incorporated by reference in its entirety. FIG. 9 illustrates some components of such a system. As shown in FIG. 9, a build roller 416 has a one or more parts built in cylindrical layers 402 as the build roller and cylindrical layers of part or support materials are rotated in the direction indicated by arrow 418. A solder fountain style heater 474 heats a part build surface 404 at or near a point where a transfuse or nip roller 470 presses developed layers 422 on a transfer belt 424 onto the part build surface to form a new part build surface.

The critical time for both the part build surface 404 and the new toner image or developed layer 422 to come to the highest non-destructive temperature is, in exemplary embodiments, just as the two surfaces are being brought together. The part build surface 404 can therefore be brought from a bulk temperature (e.g., 130° C.) to an elevated temperature (e.g., 300° C.) required to fully consolidate the developed layer into the top layers of the part in a very short period of time (e.g., 30 msec) prior to entering the nip roller contact point. For example, this results in a heating depth in one example of 2.45 mils:

$$\sqrt{\frac{200 \text{ mil}^2}{\text{s}} * 0.3 \text{ s}} = 2.45 \text{ mils}$$

As shown in FIG. 9, a sheet 475 of liquid metal at 300° C. is injected towards the nip entrance, where it is routed back into the supply pot by the seal formed between the part build surface 404 and the roller 470. Post-transfusion cooler(s) 476, for example in the form of surface-cooling air knives or jets, are configured to rapidly cool the new part build surface back to a temperature at or near the bulk temperature. The drum configuration can be preferred due to the continuous utilization of the EP engines (not shown in FIG. 9), and the continuous seal provided between the part build surface 404 and the transfer belt 424. Liquid metal heating is beneficial due to the high power densities and the temperature ceiling provided by the flowing heated metal.

Although the present disclosure has been described with reference to preferred embodiments, workers skilled in the art will recognize that changes may be made in form and detail without departing from the spirit and scope of the disclosure.

What is claimed is:

1. A method for printing a three-dimensional (3D) part with selective deposition-based additive manufacturing system, the method comprising:
    developing a layer of a powder material using at least one electrostatographic engine;
    transferring the developed layer from the at least one electrostatographic engine to a transfer medium;
    heating a part build surface of the 3D part to an elevated temperature that is higher than the temperature of the developed layers by impinging a first heat transfer liquid toward the part build surface to transfer heat to the part build surface;
    after heating the part build surface, pressing the developed layer on the transfer medium into contact with the part build surface thereby heating the one of the developed layer to a flowable state by conduction from the part build surface to form a new part build surface;
    cooling the new part build surface to remove heat energy; and
    repeating sequentially the steps of developing a subsequent layer, heating the part build surface by impinging the first heat transfer liquid toward the part build surface, pressing the subsequent developed layer on the transfer medium into contact with the part build surface to form a new part build surface, and cooling the new part build surface to remove heat energy to form the 3D part in a layer-by-layer manner.

2. The method of claim 1, wherein heating the part build surface of the 3D part by impinging the first heat transfer liquid toward the part build surface to transfer heat to the part build surface comprises impinging the first heat transfer liquid directly onto the part build surface to transfer heat to the part build surface.

3. The method of claim 1, wherein heating the part build surface of the 3D part by impinging the first heat transfer liquid toward the part build surface to transfer heat to the part build surface further comprises heating the part build surface of the 3D part to a temperature within a range between a temperature at which the material flows and a thermal-degradation kinetics threshold to form a flowable part build surface, and wherein pressing the developed layer on the transfer medium into contact with the part build surface comprises pressing the developed layer on the transfer medium into contact with the flowable part build surface to place the flowable surface into intimate contact with the developed layer and thereby heating the developed layer to the flowable state by conduction from the part build surface to form the new part build surface.

4. The method of claim 1, wherein heating the part build surface of the 3D part by impinging the first heat transfer liquid toward the part build surface transfers heat into layers of the 3D part adjacent the part build surface.

5. The method of claim 1, wherein heating the part build surface of the 3D part by impinging the first heat transfer liquid toward the part build surface comprises heating the part build surface of the 3D part by impinging a liquid metal alloy toward the part build surface.

6. The method of claim 5, wherein heating the part build surface of the 3D part by impinging the liquid metal alloy toward the part build surface comprises heating the part build surface of the 3D part using a solder fountain.

7. The method of claim 1, wherein heating the part build surface of the 3D part by impinging the first heat transfer liquid toward the part build surface comprises impinging the first heat transfer liquid directly onto a medium in contact with the part build surface.

8. The method of claim 7, wherein impinging the first heat transfer liquid directly onto the medium in contact with the part build surface comprises impinging the first heat transfer liquid directly onto a belt interposed between the first heat transfer liquid and the part build surface.

9. The method of claim 1, wherein cooling the new part build surface to remove heat energy comprises impinging a second heat transfer liquid toward the new part build surface to transfer heat from the new part build surface.

10. The method of claim 9, wherein the second heat transfer liquid comprises at least one of water, Freon, oil, liquid nitrogen, mercury and gallium.

11. The method of claim 9, wherein impinging the second heat transfer liquid toward the new part build surface comprises impinging the second heat transfer liquid onto the new part build surface using a fountain cooler.

* * * * *